US012689698B2

(12) United States Patent
    Hauf et al.

(10) Patent No.: US 12,689,698 B2
(45) Date of Patent: Jul. 21, 2026

(54) INKJET PRINT PLANNING METHOD

(71) Applicant: Kateeva, Inc., Newark, CA (US)

(72) Inventors: Christopher R. Hauf, Belmont, CA (US); Alexander Sou-Kang Ko, Santa Clara, CA (US); Anson Vandoren, Newark, CA (US)

(73) Assignee: Kateeva, Inc., Newark, CA (US)

( * ) Notice: Subject to any disclaimer, the term of this patent is extended or adjusted under 35 U.S.C. 154(b) by 676 days.

(21) Appl. No.: 17/446,535

(22) Filed: Aug. 31, 2021

(65) Prior Publication Data

US 2022/0063264 A1 Mar. 3, 2022

Related U.S. Application Data

(60) Provisional application No. 62/706,685, filed on Sep. 2, 2020.

(51) Int. Cl.
    *H04N 1/23* (2006.01)
    *H04N 1/50* (2006.01)
    *H04N 1/58* (2006.01)

(52) U.S. Cl.
    CPC ......... *H04N 1/2346* (2013.01); *H04N 1/2323* (2013.01); *H04N 1/502* (2013.01); *H04N 1/58* (2013.01)

(58) Field of Classification Search
    CPC ................................ H04N 1/502; H04N 1/58
    See application file for complete search history.

(56) References Cited

U.S. PATENT DOCUMENTS

| | | | |
|---|---|---|---|
| 9,700,908 B2 | 7/2017 | Baker et al. | |
| 2009/0116044 A1* | 5/2009 | Platt ..................... | H04N 1/6033 |
| | | | 358/1.9 |
| 2010/0059691 A1* | 3/2010 | Lewis ................... | B42D 25/29 |
| | | | 428/199 |
| 2010/0229744 A1* | 9/2010 | Krabbenhoft ....... | B41F 33/0045 |
| | | | 101/211 |
| 2012/0235313 A1* | 9/2012 | Yan ....................... | B41F 31/022 |
| | | | 425/141 |
| 2012/0307266 A1 | 12/2012 | Yu et al. | |
| 2013/0162715 A1* | 6/2013 | Tombs ................... | B41J 2/2132 |
| | | | 347/19 |
| 2014/0131313 A1 | 5/2014 | Wakamatsu et al. | |
| 2014/0186518 A1 | 7/2014 | Shih | |

(Continued)

FOREIGN PATENT DOCUMENTS

| | | |
|---|---|---|
| CN | 105216450 B | 11/2017 |
| JP | 2017004342 A | 1/2017 |

(Continued)

OTHER PUBLICATIONS

International Search Report and Written Opinion, issued Dec. 29, 2021, for International Application No. PCT/US2021/071318.

(Continued)

*Primary Examiner* — Nicholas Pachol

(74) *Attorney, Agent, or Firm* — Hauptman Ham, LLP

(57) ABSTRACT

Methods of controlling an inkjet printer are disclosed. The methods include defining shape information using a design graphics system. The shape information includes fill colors for shapes, and may include colors for edges. The colors are interpreted as one or more attributes, such as film thickness or material, for a film to be formed on a substrate.

18 Claims, 4 Drawing Sheets

(56)     References Cited

U.S. PATENT DOCUMENTS

| 2015/0134096 | A1  | 5/2015  | Travers et al. |
|---|---|---|---|
| 2015/0171368 | A1* | 6/2015  | Vronsky .............. B41M 7/0081 |
|  |  |  | 438/7 |
| 2017/0269475 | A1* | 9/2017  | Kuo ......................... H04N 1/60 |
| 2018/0162144 | A1* | 6/2018  | Miller .................. A43B 3/0078 |
| 2018/0171037 | A1* | 6/2018  | Miyano .................. C09D 11/38 |
| 2019/0096093 | A1* | 3/2019  | Shinoda .................... G06T 7/11 |
| 2019/0342468 | A1* | 11/2019 | Von Neindorff ....... H04N 1/622 |
| 2021/0086445 | A1* | 3/2021  | Harayama ............. B29C 64/209 |

FOREIGN PATENT DOCUMENTS

| JP | 2017507768 A  | 3/2017 |
|---|---|---|
| JP | 2019517401 A  | 6/2019 |
| WO | 1999004368 A1 | 1/1999 |

OTHER PUBLICATIONS

Office Action issued Feb. 5, 2025, in Chinese Patent Application No. 202180054074.1.

Notice of Reasons for Refusal Dated Jun. 27, 2025, in Japanese Patent Application No. 2023-514376.

* cited by examiner

100

102

Receive a vector graphic file from a digital design system, the vector graphic file including shape definitions and fill colors.

104

Map the vector graphic file to a raster graphic format that defines pixels.

106

Generate a printer-ready output file specifying a thickness value for each pixel based on the fill colors.

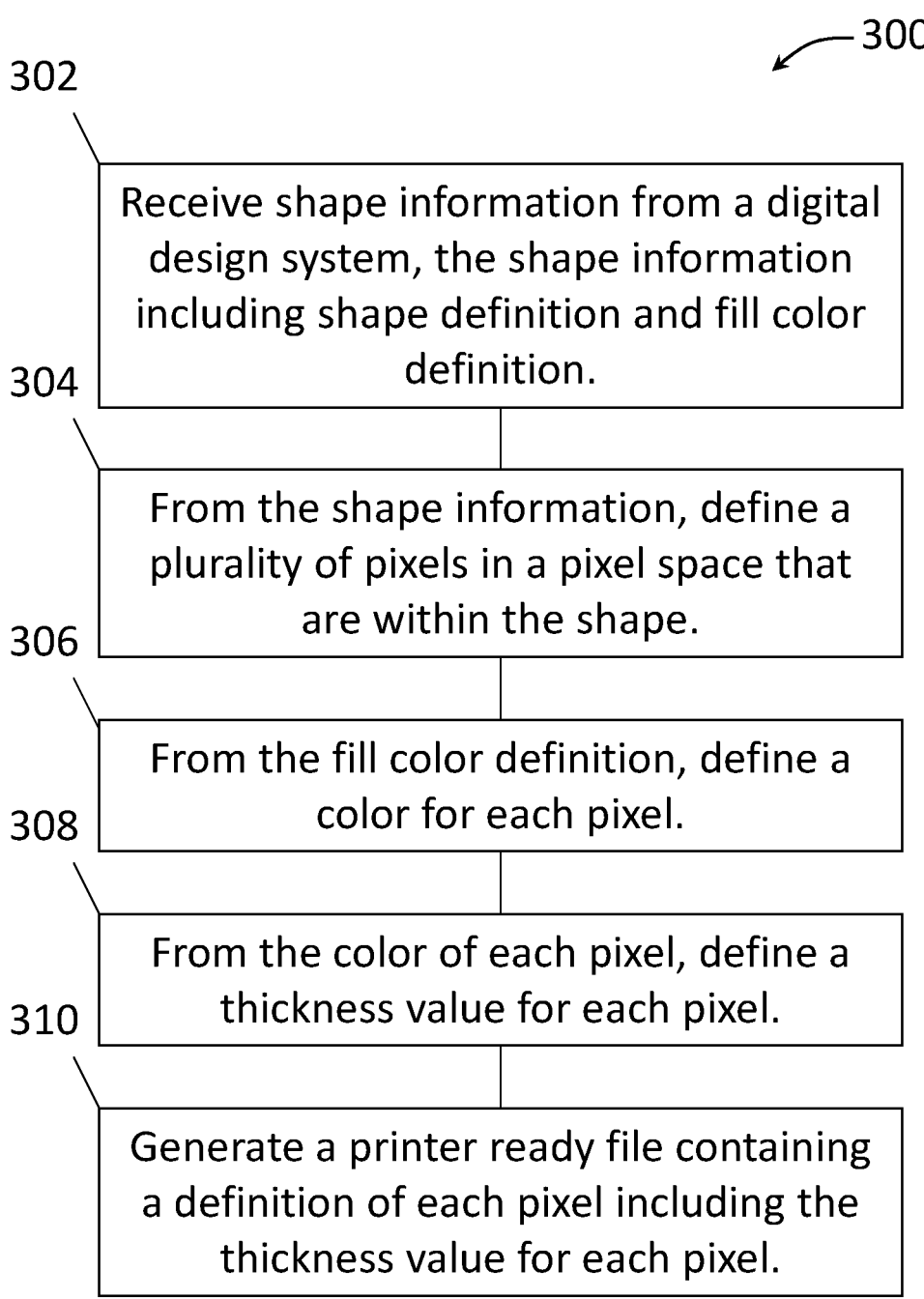

302

304

306

308

310

300

Receive shape information from a digital design system, the shape information including shape definition and fill color definition.

From the shape information, define a plurality of pixels in a pixel space that are within the shape.

From the fill color definition, define a color for each pixel.

From the color of each pixel, define a thickness value for each pixel.

Generate a printer ready file containing a definition of each pixel including the thickness value for each pixel.

FIG. 3

INKJET PRINT PLANNING METHOD

CROSS-REFERENCE TO RELATED PATENT DOCUMENTS

This application claims priority from U.S. Provisional Application No. 62/706,685, filed on Sep. 2, 2020, which is hereby incorporated herein by reference in its entirety.

FIELD

Embodiments of the present invention generally relate to inkjet printers. Specifically, methods of controlling film formation on a substrate are described.

BACKGROUND

Inkjet printing is common, both in office and home printers and in industrial scale printers used for fabricating displays, printing large scale written materials, adding material to manufactured articles such as PCB's, and constructing biological articles such as tissues. Most commercial and industrial inkjet printers, and some consumer printers, use dispensers to apply print material to a substrate. The dispenser ejects a controlled quantity of print material toward a substrate at a controlled time and rate so that the print material arrives at the substrate in a target location and makes a mark having a desired size and shape.

Inkjet printing is used to manufacture increasingly complex devices with many features and components that must be accommodated. Controlling the deposition of functional inks to manufacture such devices, where and how much to deposit in complex and differing shapes and thicknesses, is rapidly outpacing current deposition technology. There is a need for increased capability to control inkjet printing on substrates with complex design.

SUMMARY

Embodiments described herein provide a method of controlling an inkjet printer, comprising receiving digital shape information including shape definitions and fill colors; defining pixels from the shape information; and mapping the fill colors to thickness information for a film to be formed at each pixel on a substrate.

Other embodiments described herein provide a method of controlling an inkjet printer, comprising receiving digital shape information including shape definitions, fill colors, and edge information; defining pixels from the shape information; mapping the fill colors to thickness information for a film to be formed at each pixel on a substrate; and mapping the edge information to one or more edge thickness profiles of the film.

Other embodiments described herein provide a method of controlling an inkjet printer, comprising receiving digital shape information including shape definitions, fill colors, and edge information including one or more edge colors; defining pixels from the shape information; mapping the fill colors to one or more attributes of a film to be formed at each pixel on a substrate; and mapping the edge information to one or more edge thickness profiles of the film.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 is a flow diagram summarizing a method according to another embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The methods described herein are methods of defining and communicating specifications for films to be formed by depositing a liquid composition on a substrate using an inkjet printer, along with methods of creating print control information and files for controlling the deposition. The substrates on which films are typically formed may be rigid or flexible substrates, made of any type of glass or plastic, for example. Functional layers may be formed on the substrates using inkjet printing processes. These functional devices can yield electronic devices, for example electronic displays of all sizes. A substrate may contain only one device, or multiple devices may be defined and constructed on one substrate, and may thereafter be separated into individual products. Thus, each substrate may contain one or more electronic products, any of which may be display devices. For substrates containing multiple products, the products may all be the same, or some may be different from others for example in size or function. A substrate that contains multiple products thus typically has a number of functional areas that ultimately become the products, and a number of non-functional areas that may be regions between products and/or border regions around the products for substrate handling and/or edge processing.

The films are typically formed by depositing droplets of a liquid composition on the substrate. The droplets are usually small, for example having a size of 50 µm or less, for example around 20 µm, and are deposited in a way that allows the droplets to spread on the substrate and coalesce into a film having a desired thickness. The liquid material so deposited is then allowed, or caused, to solidify, for example by drying or curing, to form a film of a solid material. In general, the film may be defined according to thickness in various regions, and may be absent from some regions according to a design of arbitrary complexity. The methods described herein provide ways of defining and expressing the specification of such films so that the information of the specification can readily be transformed into print control information for controlling deposition of the droplets.

Figure 1:
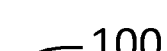
FIG. 1 is a flow diagram summarizing a method according to one embodiment.

FIG. 1 is a flow diagram summarizing a method 100 according to one embodiment. The method 100 is a method of controlling an inkjet printer to deposit a film on a substrate according to a design. The method anticipates that the design may feature different film thicknesses in different areas, and may feature some areas with no film. The method anticipates that the design may define the film in multiple layers, each layer having different thicknesses and potentially areas with no film.

At 102, a vector graphic file is received from a digital system configured to output a vector graphic file. The digital system may be a CAD system or other drawing or design system usable to draw or design a film for a device. A user typically defines the film with edges, which may be internal edges and external edges. For example the film may have a circumferential edge around the outside extremity of the film, and the film may have edges in the interior of the film defining regions of no film within the outside extremity of the film or defining regions of different thickness. The vector graphics file may contain definitions of features and regions of the film that include mathematical shape information as well as line color and fill color information.

The shapes defined by the vector graphics information are defined by the user employing a graphic design system, which is a digital processing system operating according to a graphic design program. The user "draws" shapes on the screen, optionally giving them a color definition, for example defining the color of the line outlining the shape and/or the color filling the interior of the shape. In this case, these colors can be used to define properties of the film represented by the drawing.

The vector graphic file may have layer definitions. The layer definitions may define logical layers or physical layers. Where the layer definitions define physical layers, a film to be deposited on a substrate may be defined and/or deposited as a plurality of layers, each of which may be partially or fully solidified before depositing a subsequent layer. Alternately, a group of the layers may be deposited and solidified before depositing a subsequent layer or group of layers. Where the layer definitions define logical layers, a film to be deposited may be defined by integrating the layer definitions. The vector graphic file having layer definitions will have a layer identifier associated with vector graphic information defining the layer. Thus, the vector graphic file may have a layer field set forth by a layer field identifier, which may be followed by the vector graphic information that defines the layer. In other cases, multiple files may define separate logical or physical layers, such that one file defines one layer and a plurality of files defining a plurality of layers can be executed to form a plurality of physical layers or integrated to define a single film or a number of films less than the number of files.

In addition to the vector graphic information, each layer may have layer data applicable to the entire layer. For example, the layer definition in the vector graphic file may include one or more layer property fields such as average thickness, base thickness, layer composition, thickness gradient, magnification, shrinkage, rotation, horizontal flip, vertical flip, repeat, and the like. Each such field in the vector graphic file may be set forth by a field identifier.

Each layer of the vector graphic information may further be defined in panels or regions. A layer property field may be used to define whether the layer has region definitions, for example a region definition flag. For a layer definition having region definitions, each region may use a region field set forth by a region field identifier, with the vector graphic information for the region following the region field. As with layers, each region may also have region property fields, similar to the layer property fields above, applicable to the entire region. In this way, different regions of a layer, for example representing different portions of the film to be deposited on different panels of the substrate for different end products, can have their own layer definitions.

Thus, a film definition file may include a layer definition defining one or more layers. Each layer definition may include layer definition data and shape definition data. Each layer definition may also include one or more region definitions. The shape definition data includes one or more mathematical relations that define at least one shape of the layer or region. The shape definition data may include more than one shape definition, each of which includes mathematical relations that define shapes. The shape definition data also generally includes shape attribute data, which may include stroke color, which may be segmented, and fill color. Stroke segmentation may be implemented as features of shape definition data. A shape definition may include one or more stroke definitions, which can include a mathematical relation describing the stroke, a color of the stroke, and a weight of the stroke. A shape definition may also include a fill definition relating to the stroke definition. Where more than one stroke is included in a shape definition, the shape definition may include stroke segment identifiers for each stroke segment. Each stroke segment can then be defined according to a mathematical relation, a color, and a weight.

The fill color can be used to indicate film thickness. For example in one case, a first color, such as black, indicates adding thickness to the film, a second color, such as white, indicates decreasing thickness of the film, and a third color, such as gray, indicates no change to the film. These color signals are interpreted at pixellation to define the pixels to be printed on the substrate.

At 104, the information in the vector graphic file is transformed into pixel definitions. The pixel definition is a data file that includes a coordinate position of each pixel and a film thickness, in distance units, at the pixel. A raster image processor may be used for the transformation. The pixel definition may be in layers, so a first layer of the pixel definition has first pixel definition data, a second layer of the pixel definition has second pixel definition data, and so on. The film thickness for a given pixel, in a given layer, may be zero.

In transforming the vector graphic file into pixels, the color of each pixel is determined from the vector graphic file according to known processes. As noted above, the color can be interpreted as film properties. In the example above, if the pixel is colored black, as determined from the vector graphic file, a film thickness is added to the substrate at the pixel. The film thickness to be added can be obtained from the layer or region properties of the vector graphic file, if any, or a thickness for the film, the layer, or the region can be specified by the user through a user interface of the transformation software (i.e. raster image processor). The pixel definition for a black pixel therefore consists of an x-coordinate, a y-coordinate, and a thickness to be added at that coordinate.

If the vector graphic file contains specification for more than one layer, the vector graphic specification of each layer is rasterized and the color defined at a given pixel for each layer has a cumulative effect. Suppose, for example, after rasterization of the vector graphic file the following data were obtained:

|  | Pixel P1 | | Pixel P2 | |
|---|---|---|---|---|
|  | Layer 1 | Layer 2 | Layer 1 | Layer 2 |
| Color | Black | Black | Black | gray |
| Thickness | 8 | 4 | 8 | 4 |

The rasterization process would generate a file, from the above data, reflecting a deposition thickness at pixel P1 of 12, since layer 1 adds a thickness of 8 with color black, and since layer 2 adds a thickness of 4 with color black. The deposition thickness generated for pixel P2 would be 8, since layer 1 adds a thickness of 8 with color black, but layer 2 adds no thickness with color gray. In this way, color definition in the vector graphics file represents a mathematical operation to be performed to determine thickness at a pixel. For another example, suppose after rasterization the following data were obtained:

|  | Pixel P1 | | | Pixel P2 | | |
|---|---|---|---|---|---|---|
|  | Layer 1 | Layer 2 | Layer 3 | Layer 1 | Layer 2 | Layer 3 |
| Color | Black | Gray | Black | black | White | gray |
| Thickness | 8 | 4 | 4 | 8 | 4 | 4 |

In this example, pixel P1 would have a final thickness of 12, since layers 1 and 3 add 8 and 4, respectively, while layer 2 makes no change. Pixel P2 would have a final thickness of 4, since layer 1 adds 8, layer 2 subtracts 4, and layer 3 makes no change. This would result in pixels P1 and P2 having different thicknesses for deposition by the inkjet printer.

At 106, a printer-ready output file is generated specifying a thickness value for each pixel. The thickness value for each pixel represents the cumulative effect of all the layer specifications that contribute to the printer-ready thickness for each pixel. Here, the printer-ready output file is defined by applying and integrating the shape definitions and layer definitions using the pixel information, but in alternate embodiments the shape definitions and layer definitions can be integrated in the vector graphic, or input file, format prior to defining pixels from the input information. The printer-ready output file is passed to printer control systems to translate the printer-ready output file into printer control instructions for positioning a substrate, positioning a printhead, and firing print nozzles.

It should be noted that the process described above to form a printer-ready output file may be performed in multiple cycles, with print execution between cycles. Alternately, the process can be performed in multiple cycles to form multiple output files, with no print execution between cycles. The multiple printer-ready output files can be processed sequentially by the printer control system before any printing begins, or each printer-ready output file can be printed on the substrate sequentially. Thus, a first print plan process can be performed, comprising generating a first printer-ready raster thickness file from a vector graphic file, and a second print plan process can be performed, comprising generating a second printer-ready raster thickness file from a vector graphic file, each printer-ready raster thickness file being generated according to the method 100. A print process can then be performed that comprises printing a first liquid film on a substrate according to the first printer-ready raster thickness file and printing a second liquid film on the substrate according to the second printer-ready raster thickness file. All processing to generate the two printer-ready raster thickness files can be performed prior to all printing on the substrate, or the first printer-ready raster thickness file can be printed on the substrate before the second printer-ready raster thickness file is generated.

Color information can be used to represent any film property, including composition, thickness gradient, relationship to neighboring pixels, pixel surface shape, etc. A color value for a pixel can represent multiple properties of the pixel. For example, if the color value is an eight-bit value, one bit can represent add thickness, make no change, or subtract material, while another bit can represent material selection for printing, deposition thickness at the pixel, or droplet size to be used to print the pixel. In other cases, 16 bit words defining colors can use bit definitions to encode various aspects and characteristics of the film beyond thickness.

It should be noted, in this context, that a pixel could in some cases represent a location where a number of liquid droplets can be deposited in a spaced relationship within the area of the pixel to achieve a desired effect. For example, one square pixel might include three droplet deposition positions, so a pixel color value can be used to represent deposition of droplets at the different droplet positions of the pixel. In this regard, a pixel color value could include information about structure of the liquid to be deposited in the pixel. For example, the pixel color value could include information instructing that the edge of a pixel is to be deposited to an excess thickness relative to the rest of the pixel. In the examples above, the color value was used to determine pixel thickness. Other information in the color value, for example another bit, could be used to represent that the edge of the pixel of thickness 8 should have 25% higher thickness. This would require multiple droplet deposition positions within one pixel, but when executed such a pixel would have central thickness of 8 and edge thickness of 10.

In other embodiments, an area color in a vector graphic file may be interpreted as a multiple of a reference thickness. If a layer has a reference thickness of 10 (e.g. microns), a first color may be interpreted as a first fraction of the reference thickness while a second color is interpreted as a second fraction of the reference thickness. For example, if a first region has a first color meaning 80% and a second region has a second color meaning 50%, pixels in the first region would receive a thickness value of 8 while pixels in the second region would receive a thickness value of 5, based on the reference thickness of 10. As noted above, such features can be mixed with other features using bitwise definition of the eight-bit color value.

Figure 2A:
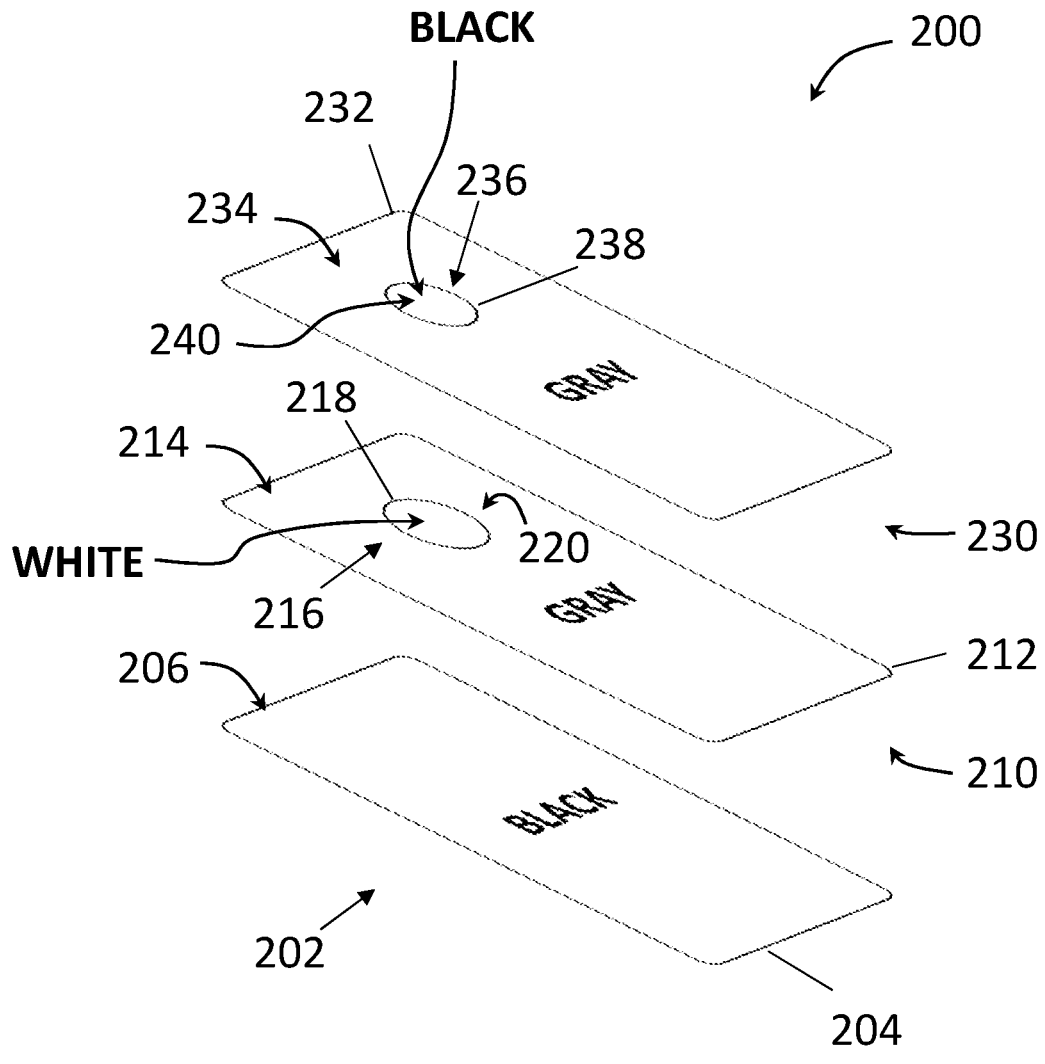
FIG. 2A is a graphical representation of a layer structure for a device illustrating use of the method of FIG. 1.
Figure 2B:
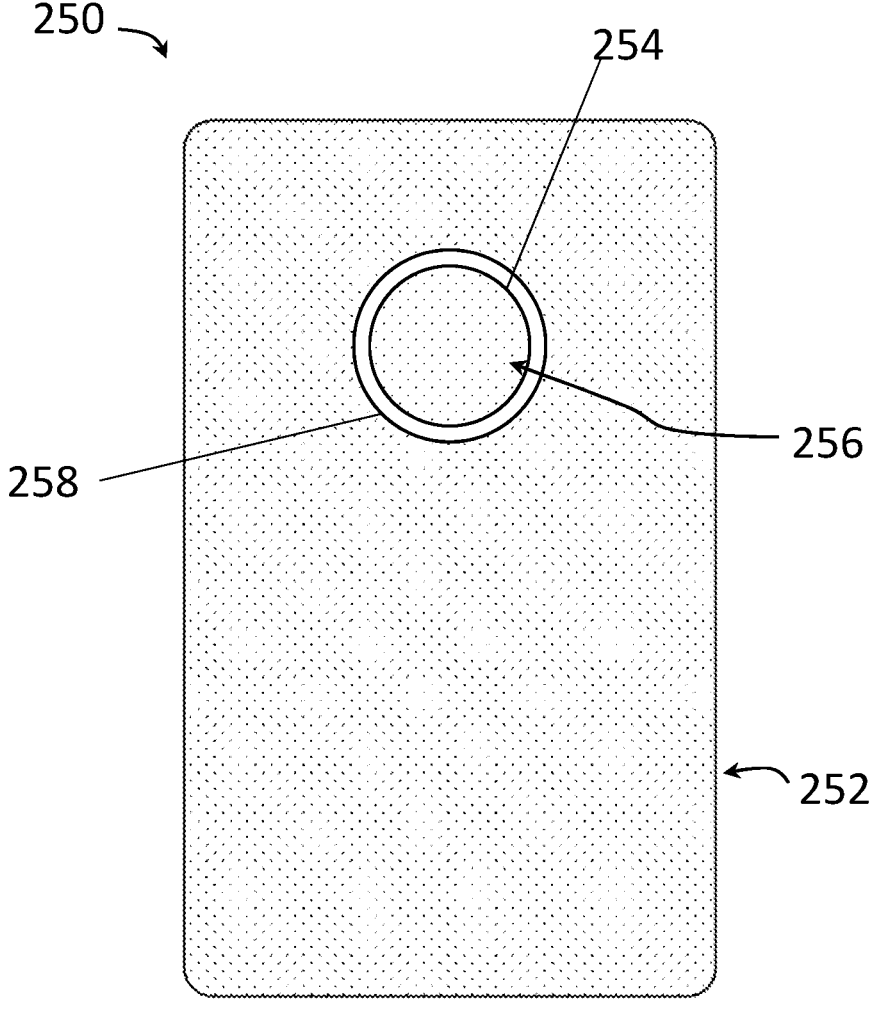
FIG. 2B is a graphical representation of the device of FIG. 2A made according to the method of FIG. 1.

FIG. 2A is a graphical representation of a layer structure 200 for a device illustrating use of the method 100. FIG. 2B is a graphical representation of the device 250 with the layers integrated. The layers of FIG. 2A are interpreted using the example described above where fill color black represents an act of adding film thickness, fill color gray represents no change to film thickness, and fill color white represents subtracting film thickness. FIG. 2A shows specification of three layers to make the film for the device of FIG. 2B. A first layer 202 is characterized by an outer boundary stroke 204 and a fill area 206. The fill area 206 is labeled with the word "black" to illustrate that the graphic specification of the first layer 202 would have fill color "black." A second layer 210 is characterized by an outer boundary stroke 212, which is congruent with the outer boundary stroke 204 of the first layer 202 (note that outer boundary stokes are not necessarily congruent in all cases), and a fill area 214. The second layer 210 has an inner feature region 216 characterized by a circular outer boundary stroke 218 and a fill area 220. The fill area 220 of the inner feature region 216 is labeled with the word "white" to illustrate that the graphic specification of the inner feature region 216 would have fill color "white." The fill area 216 of the second layer 210 outside the inner feature region 214 is labelled with the word "gray" to illustrate that the graphic specification of the fill area 216 would have fill color "gray." A third layer 230 is characterized by an outer boundary stroke 232, which is congruent with the outer boundary stroke 212 of the second layer 210 and the outer boundary stroke 204 of the first layer 202, and a fill area 234. The third layer 230 has an inner feature region 236 characterized by a circular outer boundary stroke 238 and a fill area 240. The inner feature region 236 has a diameter smaller than the diameter of the inner feature region 214 of the second layer 210. The inner feature region 236 is positioned concentric with the inner feature region 214. The fill area 240 of the inner feature region 236 is labelled with the word "black" to illustrate that the graphic specification of the inner feature region would have fill color "black." The fill area 234 of the third layer 230 outside the inner feature region 236 is labelled with the word "gray" to illustrate that the graphic specification of the fill area 234 outside the inner feature region 236 would have fill color "gray." The fill colors described above are interpreted according to the example given above to integrate the layers into a film specification.

Integrating the layers 202, 210, and 230 yields a film 252 shown on the device 250 of FIG. 2B. A central region 254 of the device 250 has a circular film 256 covering the region 254 (illustrated by dots). An annular region 258 surrounding the central region 254 has no film covering. The rest of the film 252 (illustrated by dots) surrounds the annular region 258 and extends to the edge of the device 250. The film 252 of FIG. 2B arises from the layer specifications of FIG. 2A because the black fill specification of the first layer 202 and the inner feature region 236 are interpreted as an instruction to add film thickness to the film, the gray fill specifications of the second and third layers 210 and 230 are interpreted as instructions to make no change to film thickness, and the white fill specification of the inner feature region 214 of the second layer 210 is interpreted as an instruction to subtract film thickness. Applying the layer specifications in order, first followed by second followed by third, leads to the film 252.

FIG. 3 is a flow diagram summarizing a method 300 according to another embodiment. The method 300 is a method of controlling an inkjet printer to deposit a film on a substrate according to a design. Like the method 100, the method 300 anticipates that the design may feature different film thicknesses in different areas, may feature some areas with no film, and may define the film in multiple layers, each layer having different thicknesses and potentially areas with no film.

At 302, shape information is received from a digital design system, the shape information including at least one or more shape definitions along with fill color definition for each shape defined in the shape information. The shape definitions may be according to any format or convention, such as bitmap format or the mathematical definitions typically used in vector graphic files. The shape definitions may include edges, as described above in the method 100, which may intersect with, cross, overlap, and/or surround other edges or shapes. Also as in the method 100, the shape information may include layer definitions.

At 304, pixels are defined from the shape information. A pixel space comprising pixels is defined according to pixels within shapes. This can be done through a rasterization process. Pixels are mapped to shapes in the shape information, so that the shape and fill color information that applies to each pixel is defined. Where the input shape information is in bitmap format, a scaling process may be used to transform the input shape information to a scale printable on a substrate. In such a scaling process, pixels are typically interpolated to scale the input shape information to a printer-ready file.

At 306, a color is defined for each pixel. The color may be a color value or any label representing, or mapped to, a color. The color definition need not use words identifiable as names of colors. The color definition of each pixel may use numbers, which may be standard color values, such as RGB values, or locally defined values of a limited color set for use in the printer control process.

As before, the colors derived from the shape information and mapped to the pixels represent an aspect of a film to be formed at the pixel, which may have nothing to do with color of the material of the film. In one embodiment, the color of the pixel represents a thickness of the film to be formed at the pixel. At 308, a thickness value is defined for each pixel from the color definition of the pixel. The thickness value may be defined in reference to a base thickness. For example, one color definition, such as "black" or a value representing "black," may represent adding the base thickness at the pixel, another color definition, such as "gray" or a value representing "gray," may represent adding or subtracting no thickness at the pixel, and a third color definition, such as "white" or a value representing "white," may represent subtracting the base thickness at the pixel.

When the shape information includes layer definitions, complex film specifications can result, as described in connection with the method 100. Layers may have color definitions that result in pixels with widely divergent thickness specifications for the film. The layers include different shapes and fill colors that, when overlapped to define the film thickness, can result in areas of different thickness, including zero thickness, of the film.

At 310, a printer ready file is generated containing a definition of each pixel that includes a thickness value for each pixel.

The methods 100 and 300 are typically performed using a digital processing system, including at least one digital processor, memory, and communication hardware, which is programmed to perform the methods. Such systems may include networking hardware and software to seamlessly integrate performance of the methods with other automated processes to perform inkjet printing. In particular, the methods 100 and 300 may be performed by digital processing systems integrated with an inkjet printer, such as a printer control system, or the methods 100 and 300 may be performed by a separate rendering system that outputs information to a printer control system. The rendering system may be co-hosted with a graphic design system or with a printer control system, or may be separately hosted with, or remote from, such systems. All such systems may be integrated over a network.

As noted above, color information can be used for edges defined in the shape definitions of the methods 100 and 300. In some cases, special edge processing, for example including tapering, rounding, or other shaping, may be desired. In some cases, special processing to yield a sharp, crisp edge, or to control edge thickness, may be desired. In the design graphics system, the edges of shapes can be given color definitions to correspond to special processing for the edges. In some cases, different portions of edges can be defined with different colors to receive different edge processing.

In the examples set forth above, fill colors black, gray, and white were defined with meanings in reference to a base thickness for a film to be formed on a substrate. Additionally, colors such as blue, green, and yellow, applied to the shape definition in the design graphics system, can be interpreted as invoking edge processing for edges assigned with those colors. For example, a blue color may mean that the edge is to have a linear taper to zero thickness. The rasterization and thickness processing of such a color would identify pixels that are within the edge defined as "blue," and the "blue" edge processing profile assigned to those pixels.

If "blue" means "taper to zero," the requisite edge processing profile is applied to the pixels to determine a thickness that tapers to zero, for example in a direction normal to the edge. The pixels that are within the edge can be identified to determine, for each pixel, where in the taper profile the pixel lies. That location can be used to interpolate, for example, a thickness between zero and the thickness of the first pixel within the shape. To the extent the thickness of the first pixel within the shape is influenced by layer definitions, the edge processing can be delayed until all layer processing to determine thickness of pixels within shapes is completed. Any edge processing can be defined and assigned a color, and edge processing can be done within the same processing system as fill processing, or in another digital processing system.

Color definitions can also be used to define functional aspects. For example, in some cases, a color definition can be used to identify where functional pixels are to be formed and where non-functional pixels are to be formed. For example, if a shape definition of a product design is to define where light-emitting pixels are to be formed, a shape can be defined for the shape definition, and a fill color can be assigned to the shape definition to be interpreted as specifying an area where light-emitting pixels are to be formed. The printer control information formed from such shape definition may include specification for a light-emitting material to be deposited in a pixellated film. A base thickness parameter can also be used with such color information to render a thickness specification for a light-emitting material.

Thus, color definitions can be used to define materials as well as thicknesses. For example, each color may represent both a film material and a thickness operation (add, no change, subtract). When paired with base thickness information, which may be specified by film material, colors assigned at the product design stage may be interpreted as instructions to add, subtract, or make no change to thickness of a specified material to be deposited. In this way, fill color for shapes, potentially defined in layers, can specify thicknesses of functional materials, such as light-emitting materials and sealing materials, to be applied to a substrate to form light-emitting areas of a substrate, sealed areas of a substrate, and non-functional areas of a substrate in one product design.

While the foregoing is directed to embodiments of the present invention, other and further embodiments of the present disclosure may be devised without departing from the basic scope thereof, and the scope thereof is determined by the claims that follow.

What is claimed is:

1. A method of controlling an inkjet printer, comprising:
   receiving digital shape information including shape definitions of user-defined shapes and user-selected fill colors that define portions of a film to be formed on a substrate using the inkjet printer;
   defining pixels from the shape information;
   assigning a different thickness change operation to each fill color, at least one thickness change operation being a reduction in thickness relative to a base thickness; and
   applying the thickness change operation assigned to the color of each pixel.

2. The method of claim 1, wherein three fill colors are used, a first fill color to denote adding a prescribed thickness, a second fill color to denote no thickness change, and a third fill color to denote subtracting the prescribed thickness.

3. The method of claim 1, wherein the shape information is vector graphic information.

4. The method of claim 1, wherein the shape information includes layer information.

5. The method of claim 1, wherein the shape information includes edge color information.

6. The method of claim 1, wherein applying the thickness change operation assigned to the color of each pixel comprises applying the thickness change operation to a base thickness value.

7. The method of claim 1, wherein the digital shape information is a bitmap.

8. A method of controlling an inkjet printer, comprising:
   receiving digital shape information including shape definitions of user-defined shapes, user-selected fill colors, and user-defined edge information that define portions of a film to be formed on a substrate using the inkjet printer;
   defining pixels from the shape information;
   assigning a different thickness change operation to each fill color, at least one thickness change operation being a reduction in thickness relative to a base thickness;
   applying the thickness change operation assigned to the color of each pixel; and
   mapping the edge information to one or more edge thickness profiles of the film.

9. The method of claim 8, wherein three fill colors are used, a first fill color to denote adding a prescribed thickness, a second color to denote no thickness change, and a third color to denote subtracting the prescribed thickness.

10. The method of claim 8, wherein the shape information is vector graphic information.

11. The method of claim 8, wherein the shape information includes layer information.

12. The method of claim 11, wherein the layer information comprises shape information for a plurality of layers, and the shape information for the plurality of layers is processed sequentially, layer by layer, to define the thickness information for the film.

13. The method of claim 8, wherein the edge information includes edge color information.

14. The method of claim 13, wherein the edge color information is mapped to one or more edge thickness profiles of the film.

15. The method of claim 8, wherein applying the thickness change operation assigned to the color of each pixel comprises applying the thickness change operation to a base thickness value.

16. The method of claim 15, wherein the shape information includes layer information defining layers, each layer having shape information, and the assigning is performed for each layer to define the thickness information for the film.

17. A method of controlling an inkjet printer, comprising:
   receiving digital shape information including shape definitions of user-defined shapes, user-selected fill colors, and user-defined edge information including one or more edge colors that define portions of a film to be formed on a substrate using the inkjet printer;
   defining pixels from the shape information;
   assigning a different thickness change operation to each fill color, at least one thickness change operation being a reduction in thickness relative to a base thickness;

applying the thickness change operation assigned to the
color of each pixel; and mapping the edge information to one or more edge
thickness profiles of the film.

18. The method of claim 17, wherein the digital shape 5
information is a bitmap or a vector graphic file.

\*  \*  \*  \*  \*